Fig. 1

Fig. 8
Fig. 9
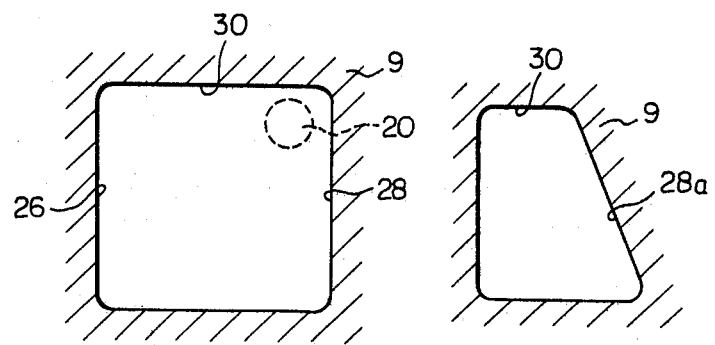
Fig. 10
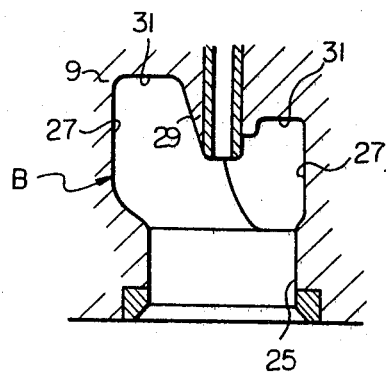

INTAKE SYSTEM OF A MULTI-CYLINDER INTERNAL COMBUSTION ENGINE

DESCRIPTION OF THE INVENTION

The present invention relates to an intake system of an internal combustion engine.

Particularly in a compression-ignition type internal combustion engine, in order to create a strong swirl motion in the combustion chamber of an engine at the time of the intake stroke, a helically-shaped intake port comprising a substantially straight inlet passage portion and a helical portion is used. However, even if such a helically-shaped intake port is applied to a spark-ignition type gasoline engine and, in addition, a slight change of the construction of the helically-shaped intake port is effected so as to create a swirl motion of the strength necessary to obtain a good combustion when an engine is operating under a light load, since the engine speed normally used in a gasoline engine is considerably greater than that normally used in a compression-ignition type engine, the flow resistance which the mixture flowing in the helically-shaped intake port is subjected to becomes large in a gasoline engine. As a result of this, a problem occurs in which the volumetric efficiency is reduced when a gasoline engine is operating at a high speed under a heavy load.

In addition, even if a helically-shaped intake port is used, when the flow velocity of the mixture flowing within the intake port is low as in the case wherein an engine is operating at a low speed under a light load, the vaporization of fuel and the mixing operation between fuel and air are not fully promoted. As a result of this, since the air-fuel ratio of the mixture fed into the cylinder is varied every cycle, a problem occurs in that it is difficult to obtain a stable combustion. Particularly in a gasoline injection type engine, since the fuel is injected into the intake port in the form of liquid droplets, it is necessary to promote the vaporization of fuel within the intake port when an engine is operating at a low speed under a light load for obtaining a stable combustion.

An object of the present invention is to provide an intake system of an internal combustion engine which is capable of promoting the vaporization of fuel and creating a strong swirl motion in the combustion chamber when the engine is operating under a light load by using a helically-shaped intake port which is capable of ensuring a high volumetric efficiency when the engine is operating at a high speed under a heavy load.

According to the present invention, there is provided an internal combustion engine having a plurality of cylinders, each having a helically-shaped intake port which comprises a helical portion having an outlet open end, an intake valve arranged in said outlet open end, and an inlet passage portion tangentially connected to said helical portion and having an inlet open end, said inlet passage portion being defined by an upper wall, a bottom wall, a first side wall arranged at a position near an axis of said intake valve, and a second side wall arranged at a position remote from the axis of said intake valve, said engine comprising: at least one intake passage common to at least two cylinders and having at least two outlets, each being connected to said respective inlet open end of said intake port; fuel supply means arranged in said intake passage; valve means arranged in said intake passage and opened in accordance with an increase in the level of the load of said engine; a common connecting passage, and; at least two branch connecting passages each being connected to said common connecting passage and having an opening which opens into said respective intake port in the vicinity of the upper wall of said intake port at a position located downstream of said valve means.

The present invention may be more fully understood from the description of preferred embodiments of the invention set forth below, together with the accompanying drawings.

BRIEF DESCRIPTION OF THE DRAWINGS

In the drawings:

FIG. 1 is a plan view, partly in cross-section, of an embodiment of an engine according to the present invention;

FIG. 8 is a cross-sectional view taken along line VIII—VIII in FIG. 5;

FIG. 9 is a cross-sectional view taken along line IX—IX in FIG. 5;

FIG. 10 is a cross-sectional view taken along line X—X in FIG. 5;

DESCRIPTION OF PREFERRED EMBODIMENTS

Figure 2:
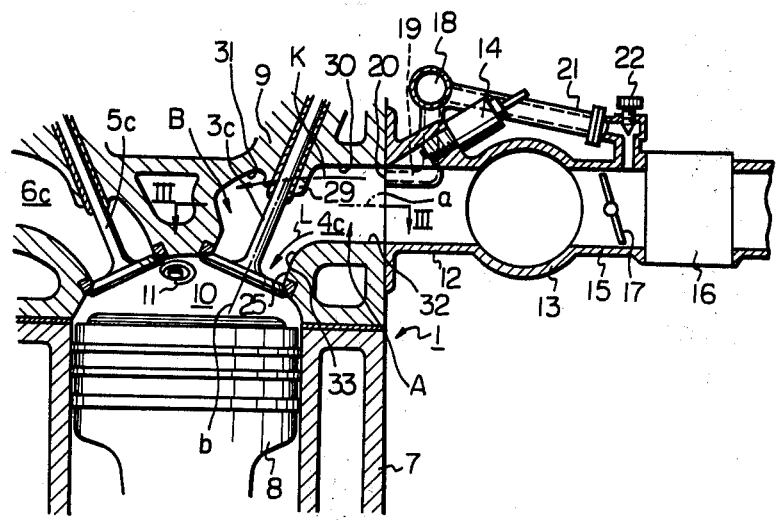
FIG. 2 is a cross-sectional side view taken along line II—II in FIG. 1.
Figure 3:
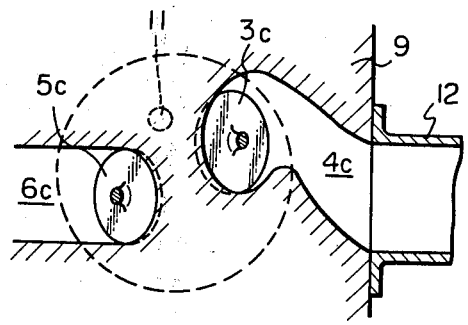
FIG. 3 is a cross-sectional plan view taken along line III—III in FIG. 2.
Figure 1:
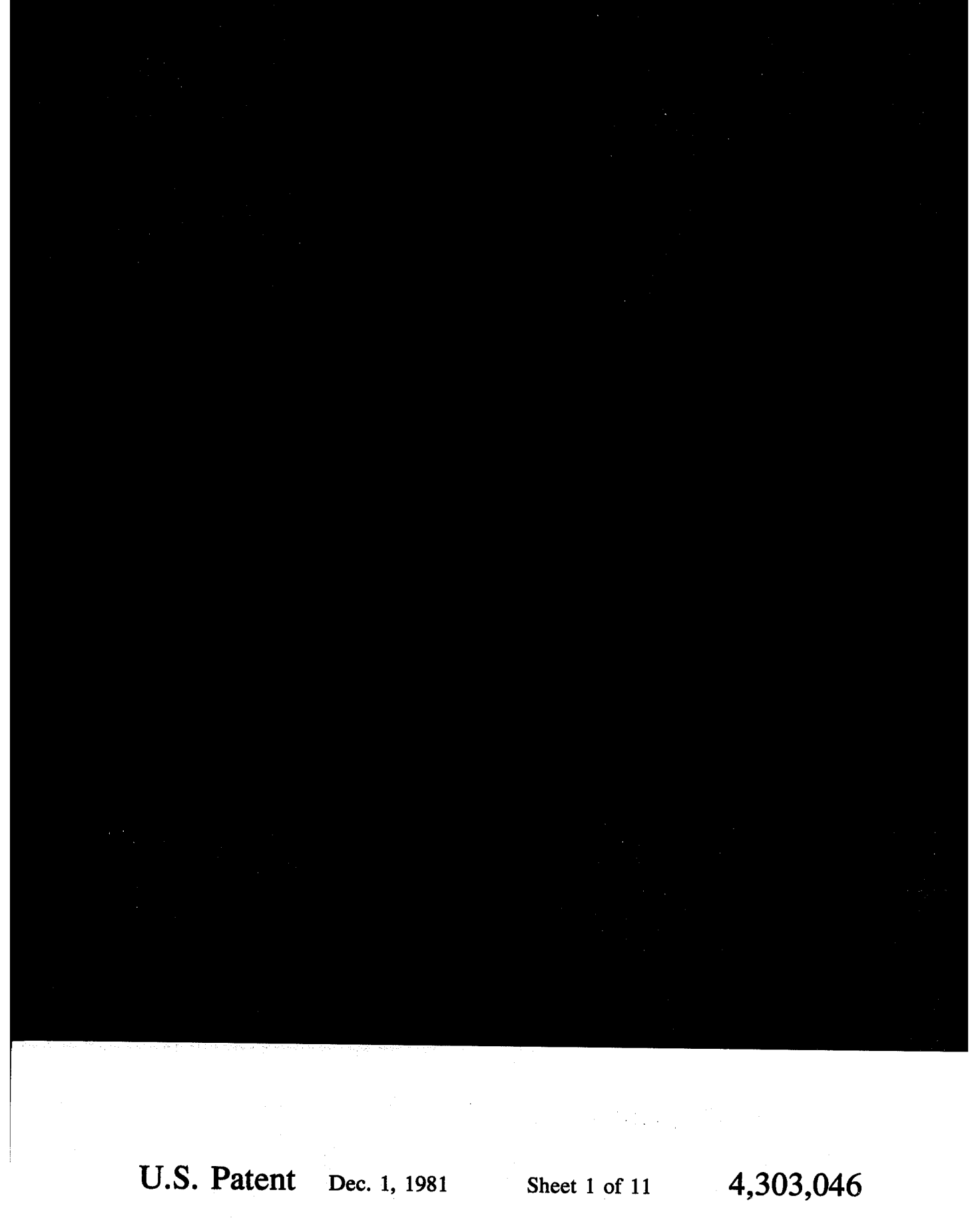
Figure 2:
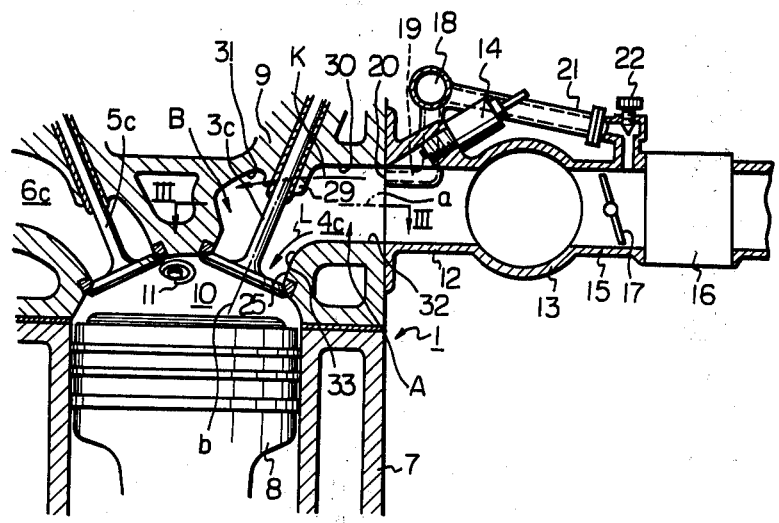
Figure 3:
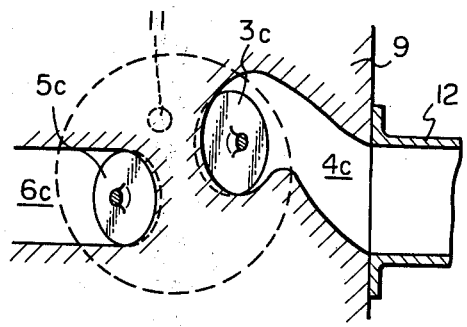

Referring to FIG. 1, 1 designates an engine body; 2a, 2b, 2c, 2d designate No. 1 cylinder, No. 2 cylinder, No. 3 cylinder and No. 4 cylinder, respectively; 3a, 3b, 3c, 3d designate intake valves; 4a, 4b, 4c, 4d designate helically-shaped intake ports; 5a, 5b, 5c, 5d designate exhaust valves, and; 6a, 6b, 6c, 6d designate exhaust ports. Referring to FIG. 2, reference numeral 7 designates a cylinder block, 8 a piston which is reciprocally movable in the cylinder block 7, 9 a cylinder head fixed onto the cylinder block 7, 10 a combustion chamber, and 1 a spark plug. As illustrated in FIGS. 1 and 2, an intake passage such as an intake manifold 13 having four manifold branches 12 is fixed onto the cylinder head 9, and each of the manifold branches 12 is connected to the corresponding intake port 4a, 4b, 4c, 4d. A fuel injector 14 is provided for each manifold branch 12, and the fuel is injected from each of the fuel injectors 14 towards the corresponding intake port 4a, 4b, 4c, 4d. Air is introduced into the intake manifold 13 via an air duct 15, and an air flow meter 16 is arranged in the air duct 15 for measuring the flow rate of the air. In addition, a throttle valve 17 connected to the accelerator pedal (not shown) is arranged in the air duct 15. The air flow meter 16 is connected to an electronic control circuit (not shown) provided for controlling the amount of fuel injected from fuel injectors 14 to be proportional to the amount of the sucked air on the basis of the output signal of the electronic control circuit. As is illustrated in FIGS. 1 and 2, a common connecting passage or channel 18 extending in the longitudinal direction of the engine body 1 and having a cross-sectional area which is smaller than that of the manifold branches 12 is arranged above the manifold branches 12. In addition, four branch connecting passages or channel branches 19 which are in communication with the common connecting channel 18 and which have a cross-sectional area smaller than that of the manifold branches 12 are provided. Each of the channel branches 19 opens into the corresponding intake port 4a, 4b, 4c, 4d at a position near the upper wall of the intake port 4a, 4b, 4c, 4d and, in addition, as illustrated in FIG. 2, the opening 20 of the channel branch 19 is directed tangentially to the upper wall of the intake port 4c. Furthermore, as is hereinafter described in detail, the opening 20 is arranged at a position near the side wall of the intake port 4a, 4b, 4c, 4d, which is located on the lower side in FIG. 1. The central portion of the common connecting channel 18 is connected to the air duct 15 at a location upstream of the throttle valve 17 via an air supply conduit 21 and an idle adjustment screw 22.

When the engine is operating under an idling condition or under a light load near the idling condition, a large part of the air is fed into the intake ports 4a, 4b, 4c, 4d from the channel branches 19 via the air supply conduit 21 and the common connecting channel 18. At this time, since the channel branches 19 have a small cross-sectional area, the air is caused to flow within the channel branches 19 at a high speed and, as a result, the air is spouted from the channel branches 19 into the intake ports 4a, 4b, 4c, 4d at a high speed. On the other hand, when the throttle valve 17 is opened, a large part of the air is fed into the combustion chamber 10 via the manifold branches 12.

Figure 4:
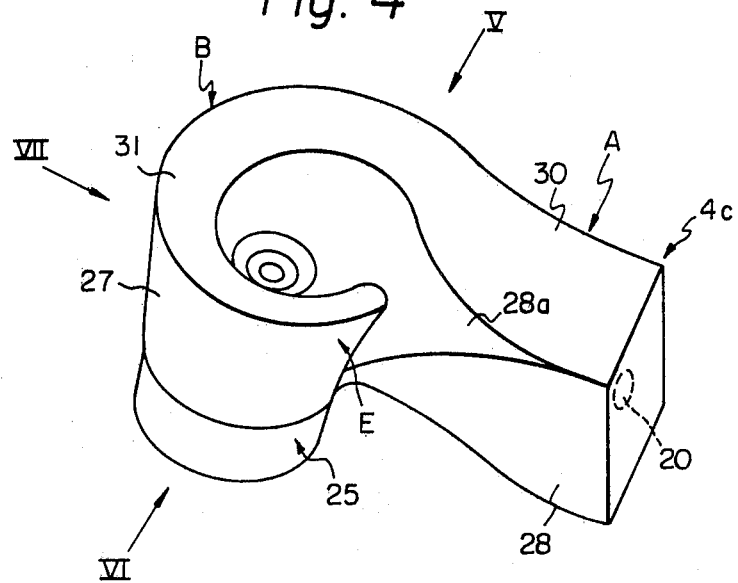
FIG. 4 is a perspective view of a helical shaped intake port schematically illustrating the helical shaped intake port illustrated in FIG. 2.
Figure 5:
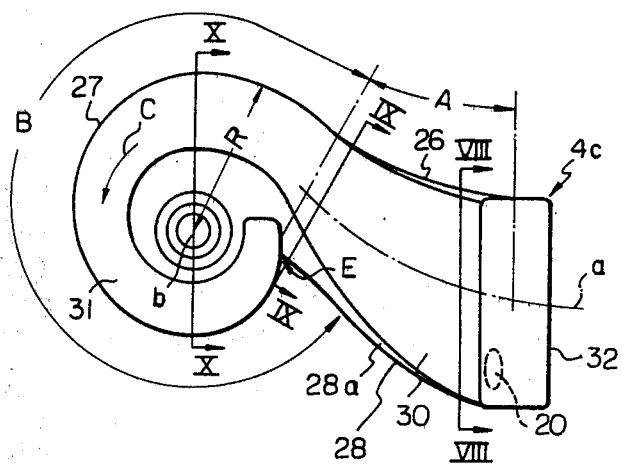
FIG. 5 is a plan view in the direction of arrow V in FIG. 4.
Figure 6:
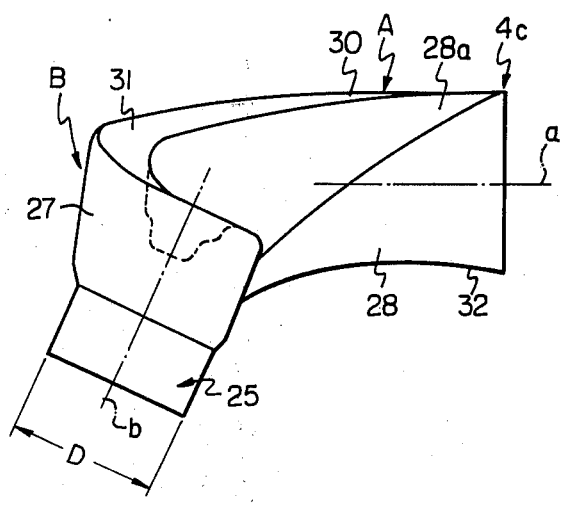
FIG. 6 is a side view in the direction of arrow VI in FIG. 4.
Figure 7:
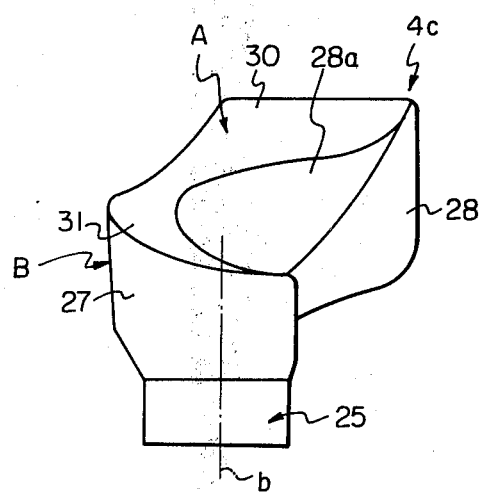
FIG. 7 is a side view in the direction of arrow VII in FIG. 4.

FIGS. 4 through 7 schematically illustrate the shape of the helically-shaped intake port 4c illustrated in FIGS. 1 and 2. As is illustrated in FIG. 5, the helically-shaped intake port 4c according to the present invention comprises an inlet passage portion A and a helical portion B, the longitudinal central axis a of the inlet passage portion A being slightly curved. The inlet open end of the inlet passage portion A has a rectangular cross-section (FIG. 8), and the mixture outlet portion 25 of the helical portion B has a cylindrical inner wall which extends circumferentially about the helix axis b of the helical portion B. As illustrated in FIG. 2, the helix axis b, that is, the axis of the intake valve 3c, is inclined by approximately 23 degrees with respect to the axis of the cylinder, and the inlet passage portion A extends substantially horizontally. Turning to FIGS. 4 through 7, the side wall 26 of the inlet passage portion A, which is located remote from the helix axis b, is arranged so as to be substantially vertical and is smoothly connected to the side wall 27 of the helical portion B, which extends circumferentially about the helix axis b. As illustrated in FIGS. 7 and 10, the side wall 27 of the helical portion B is so formed that it expands outwards from the cylindrical inner wall of the mixture outlet portion 25. In addition, as illustrated in FIG. 5, the side wall 27 is so formed that the distance R between the side wall 27 and the helix axis b is maintained constant at a position near the inlet passage portion A and is gradually reduced towards the helical direction C. The distance R becomes approximately equal to the radius of the cylindrical inner wall of the mixture outlet portion 25 (FIG. 4) at the helix terminating portion E.

As illustrated in FIGS. 4 and 5, the side wall 28 of the inlet passage portion A, which is located near the helix axis b, has on its upper portion an inclined wall portion 28a which is arranged to be directed downwards. The width of the inclined wall portion 28a is gradually increased towards the helical portion B and, the entire portion of the side wall 28 is inclined at the connecting portion of the inlet passage portion A and the helical portion B. The upper half of the side wall 28 is smoothly connected to the circumferential wall of a cylindrical projection 29 (FIG. 2), and the lower half of the side wall 28 is connected to the side wall 27 of the helical portion B at the helix terminating portion E of the helical portion B.

As is illustrated in FIGS. 2 and 6, the upper wall 30 of the inlet passage portion A extends substantially horizontally from the inlet open end of the inlet passage portion A towards the helical portion B and is smoothly connected to the upper wall 31 of the helical portion B. The upper wall 31 gradually descends towards the helical direction C (FIG. 5) and is connected to the side wall 28 of the inlet passage portion A. Since the inclined wall portion 28a of the inlet passage portion A is so formed that the width thereof is gradually increased towards the helical portion B as mentioned above, the width of the upper wall 30 of the inlet passage portion A is gradually reduced. in addition, as illustrated in FIG. 5, since the side wall 27 of the helical portion B is so formed that the distance R between the side wall 27 and the helical axis b is maintained constant at a position near the inlet passage portion A and is gradually reduced towards the helical direction C as mentioned above, the width of the upper wall 31 of the helical portion B is gradually reduced towards the helical direction C. Consequently, it will be understood that the upper wall 30 of the inlet passage portion A extends substantially horizontally towards the helical portion B, while the width of the upper wall 30 is gradually reduced, and that the upper wall 31 of the helical portion B gradually descends towards the helical direction C, while the width of the upper wall 31 is gradually reduced.

As illustrated in FIGS. 2 and 6, the bottom wall 32 of the inlet passage portion A extends substantially horizontally in parallel with the upper wall 30 towards the helical portion B and is connected to the cylindrical inner wall of the mixture outlet portion 25 via a smoothly curved wall 33 as illustrated in FIG. 2. From FIG. 5, it will be understood that the width of the bottom wall 32 is gradually reduced towards the helical portion B.

The position of the opening 20 of the channel branch 19 is illustrated by the broken line in FIGS. 4, 5 and 8. From FIGS. 4, 5 and 8, it will be understood that the opening 20 of the channel branch 19 is arranged at a position near the upper wall 30 and the side wall (28) of the inlet passage portion A.

In FIGS. 1, 2 and 5, when the engine is operating in an idling condition or under a light load near an idling condition, a large part of the air is spouted at a high speed from the channel branch 19 into the intake port 4c via the air supply conduit 21 and the common connecting channel 18. The air spouted from the channel branch 19 flows along the upper wall 30 of the intake port 4c while the flow direction thereof is deflected towards the side wall 26 by the inclined wall portion 28a. Since the widths of the upper walls 30 and 31 are gradually reduced towards the flow direction of the air as mentioned above, the cross-section of the flow path of the air flowing along the upper walls 30 and 31 is gradually reduced in the direction of air flow. In addition, since the upper wall 31 gradually descends towards the helical direction C, the air flowing along the upper walls 30 and 31 is deflected downwards, while the velocity thereof is gradually increased. As a result of this, a swirl motion moving downwards while swirling is created in the helical portion B. At the same time, the liquid droplets of the fuel injected from the fuel injector 14 into the intake port 4c are divided into fine particles due to the strong swirl motion created in the helical portion B; as a result, the vaporization of the liquid fuel and the mixing operation between the fuel and the air are promoted. The mixture thus formed in the helical portion B moves downwards while smoothly swirling along the cylindrical inner wall of the mixture outlet portion 25 and, thus, a strong swirl motion rotating about the helix axis b is created within the mixture outlet portion 25 (FIG. 4). This swirling mixture flows into the combustion chamber 10 via the valve gap formed between the intake valve 3c and its valve seat and causes a strong swirl motion in the combustion chamber 10. As mentioned above, since the vaporization of the fuel and the mixing operation between the fuel and the air are promoted and, in addition, a strong swirl motion is created in the combustion chamber 10, the burning velocity is considerably increased and, as a result, a stable idling operation can be ensured.

When the throttle valve 17 is opened, a large part of the air is introduced into the combustion chamber 10 via the manifold branch 12. A part of the air introduced into the inlet passage portion A moves forward along the upper walls 30 and 31, as illustrated by the arrow K in FIG. 2, and the remaining part of the air impinges upon the inclined wall portion 28a (FIG. 4) and is deflected downwards. As a result, the remaining part of the air flows into the mixture outlet portion 25 without swirling, as illustrated by the arrow L in FIG. 2. By forming the inclined wall portion 28a (FIG. 4) as mentioned previously, since a part of the air introduced into the inlet passage portion A flows into the mixture outlet portion 25 along the smoothly curved wall 33 without swirling, the flow resistance which the air flowing in the helically-shaped intake port 4c is subjected to becomes considerably small as compared with that in a conventional helically-shaped intake port. As a result of this, a high volumetric efficiency can be ensured when an engine is operating at a high speed under a heavy load.

Figure 11:
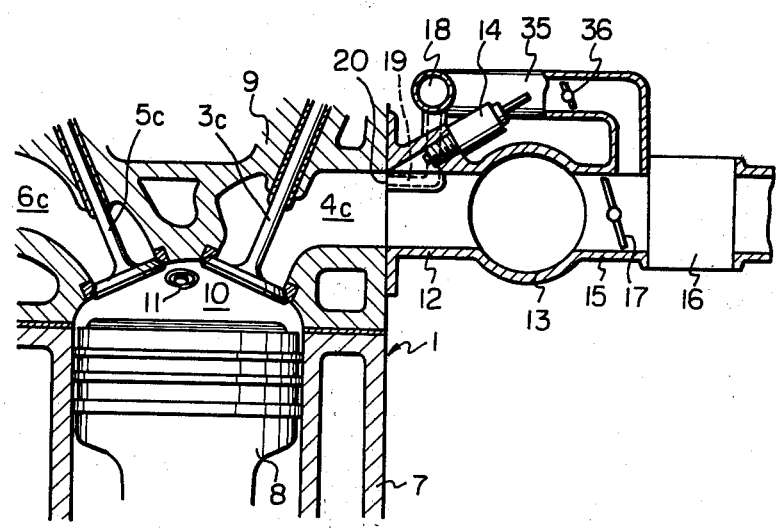
FIG. 11 is a cross-sectional side view of another embodiment according to the present invention.
Figure 12:
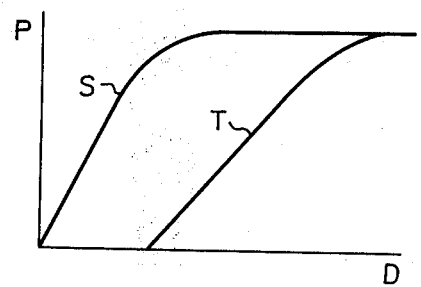
FIG. 12 is a graph showing changes in the opening degrees of the throttle valve and the auxiliary throttle valve which are illustrated in FIG. 11.

FIG. 11 illustrates another embodiment according to the present invention. Referring to FIG. 11, the central portion of the common connecting channel 18 is connected via an air supply conduit 35 to the air duct 15 located between the throttle valve 17 and the air flow meter 16, and an auxiliary throttle valve 36 is arranged in the air supply conduit 35. FIG. 12 illustrates the opening degrees of the throttle valve 17 and the auxiliary throttle valve 36. In FIG. 12, the ordinate P indicates the opening degrees of the throttle valve 17 and the auxiliary throttle valve 36, and the abscissa D indicates the depression of the accelerator pedal (not shown). In addition, in FIG. 12, the curved line S indicates the opening degree of the auxiliary throttle valve 36, and the curved line T indicates the opening degree of the throttle valve 17. From FIG. 12, it will be understood that, when the accelerator pedal is depressed, the auxiliary throttle valve 36 is gradually opened while the throttle valve 17 remains fully closed, and that, when the auxiliary throttle valve 36 is almost fully opened, the throttle valve 17 is gradually opened while the auxiliary throttle valve 36 remains fully opened. In addition, the throttle valve 17 and the auxiliary throttle valve 36 are interconnected to each other by means of a link mechanism (not shown).

In this embodiment, as will be understood from FIG. 12, all the air is fed into the intake port 4c from the channel branch 19 via the air supply conduit 35 and the common connecting channel 18 when the engine is operating under a light load. Consequently, at this time, the vaporization of the fuel and the mixing operation between the fuel and the air can be promoted and, at the same time, a strong swirl motion can be created in the combustion chamber 10. On the other hand, when the engine is operating under a heavy load, since the throttle valve 17 is opened to a great extent, a large part of the air is introduced into the combustion chamber 10 via the manifold branch 12 having a small flow resistance. As a result of this, a high volumetric efficiency can be ensured.

Figure 13:
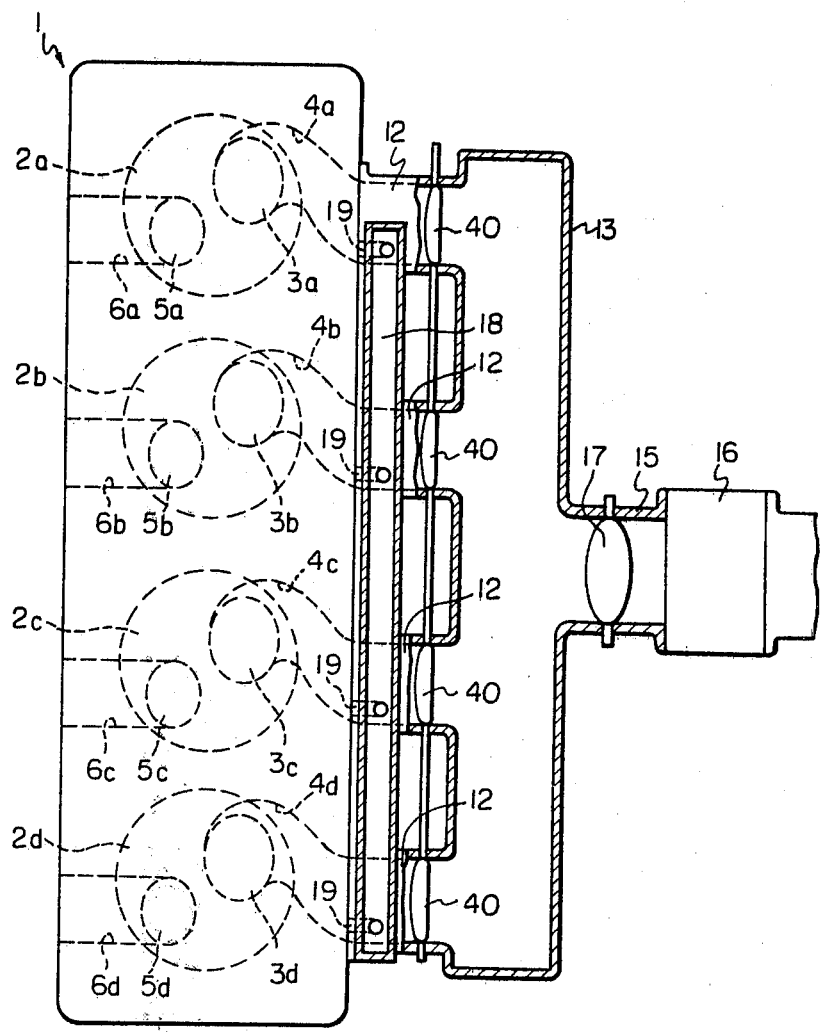
FIG. 13 is a plan view, partly in cross-section, of a further embodiment according to the present invention.
Figure 14:
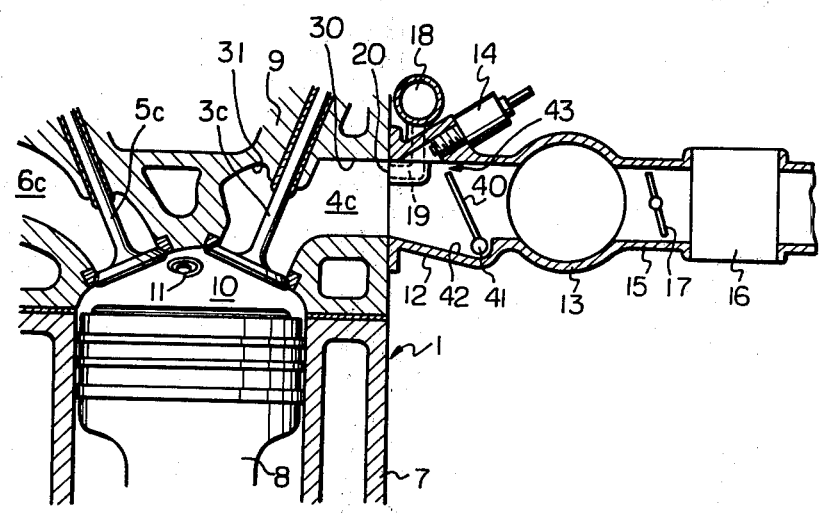
FIG. 14 is a cross-sectional side view of the engine illustrated in FIG. 13.

FIGS. 13 and 14 illustrate a further embodiment according to the present invention. In this embodiment, the common connecting channel 18 is connected only to the intake ports 4a, 4b, 4c, 4d via the corresponding channel branches 19. Furthermore, in addition to the throttle valve 17, secondary throttle valves 40 are arranged in the manifold branches 12. All the secondary throttle valves 40 are attached onto a common throttle shaft 41 which is arranged within wedge-shaped grooves 42 formed on the bottom walls of the manifold branches 12. The throttle valve 17 and the secondary throttle valves 40 are interconnected to each other by means of a link mechanism (not shown) so that the secondary throttle valves 40 are opened as the throttle valve 17 is opened.

Figure 17:
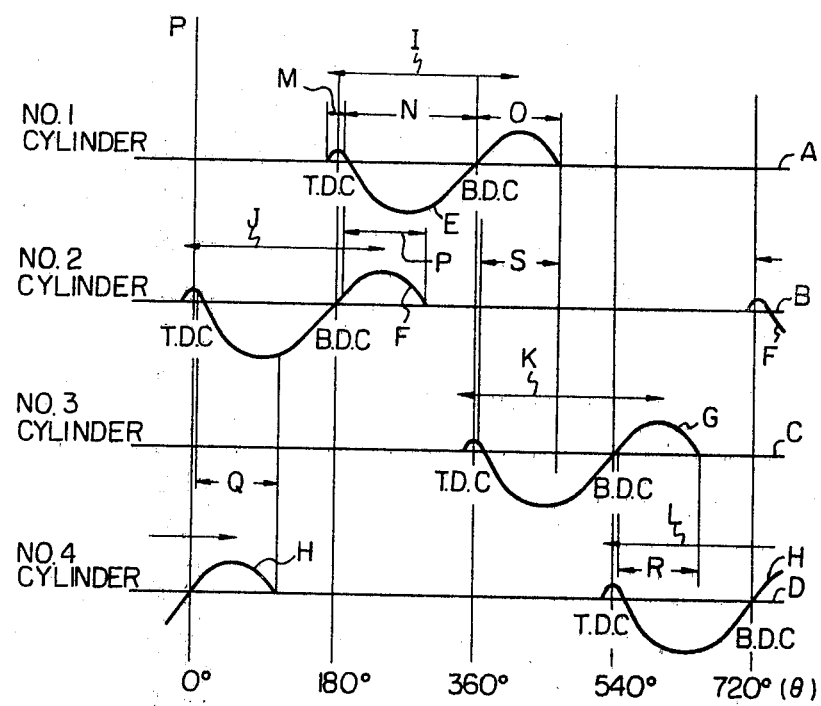
FIG. 17 is a graph showing changes in pressure in the intake port located at a position near the rear face of the valve head of the intake valve.

FIG. 17 illustrates changes in pressure in the intake ports 4a, 4b, 4c, 4d. In FIG. 17, the abscissa $\theta$ indicates crank angle, and the ordinate P indicates pressure in the intake port in the vicinity of the rear face of the valve head of the intake valve (hereinafter referred to as an intake port pressure). In addition, each of the reference lines A, B, C, D indicates the atmospheric pressure. Furthermore, in FIG. 17, the curved lines E, F, G and H indicate changes in the intake port pressure in the intake ports 4a, 4b, 4c, and 4d, respectively, and the arrows I, J, K and L indicate the opening duration of the intake valves 3a, 3b, 3c and 3d, respectively. Referring to the change in pressure in the No. 1 cylinder shown in FIG. 17, the intake port pressure becomes a positive pressure over the range M of the crank angle immediately after the intake valve is opened, and then a vacuum is produced in the intake port of the No. 1 cylinder over the range N of the crank angle in which the piston moves downwards. After this, the intake port pressure again becomes a positive pressure over the range 0 of the crank angle after the piston begins to move upwards. The change in the intake port pressure in the remaining cylinders is the same as that in the intake port pressure in the No. 1 cylinder. Consequently, referring to the range P of the crank angle of the No. 1 cylinder and No. 2 cylinder shown in FIG. 17, it will be understood that a vacuum is produced in the intake port of the No. 1 cylinder, and that, at this time, the intake port pressure of the No. 2 cylinder is positive. In addition, from FIG. 17 it will be understood that, referring to the range Q of the crank angle of the No. 2 cylinder and No. 4 cylinder, a vacuum is produced in the intake port of the No. 2 cylinder and, at this time, the intake port pressure of the No. 4 cylinder is positive; referring to the range R of the crank angle of the No. 3 cylinder and the No. 4 cylinder, a vacuum is produced in the intake port of the No. 4 cylinder and, at this time, the intake port pressure of the No. 3 cylinder is positive; and referring to the range S of the crank angle of the No. 1 cylinder and the No. 3 cylinder, a vacuum is produced in the intake port of the No. 3 cylinder and, at this time, the intake port pressure of the No. 1 cylinder is positive. Consequently, referring to the No. 1 cylinder and the No. 2 cylinder shown in FIG. 17, it will be understood that, in the first half of the intake stroke of the No. 1 cylinder, the mixture in the intake port 4b of the No. 2 cylinder is fed into the intake port 4a of the No. 1 cylinder via the channel branch 19, the common connecting channel 18 and the channel branch 19 due to the pressure difference between the vacuum in the intake port 4a and the positive pressure in the intake port 4b. In the same manner as described above, when the No. 2 cylinder is in the intake stroke, the mixture in the intake port 4d of the No. 4 cylinder is fed into the intake port 4b of the No. 2 cylinder via the channel branch 19, the common connecting channel 18 and the channel branch 19; when the No. 4 cylinder is in the intake stroke, the mixture in the intake port 4c of the No. 3 cylinder is fed into the intake port 4d of the No. 4 cylinder via the channel branch 19, the common connecting channel 18 and the channel branch 19; and when the No. 3 cylinder is in the intake stroke, the mixture in the intake port 4a of the No. 1 cylinder is fed into the intake port 4c of the No. 3 cylinder via the channel branch 19, the common connecting channel 18 and the channel branch 19. As mentioned above, due to the pressure difference between the intake port pressures in the intake ports 4a, 4b, 4c, 4d, the mixture is spouted from the channel branches 19 of the cylinder which is in the intake stroke into the corresponding intake ports 4a, 4b, 4c, 4d at a high speed.

As illustrated in FIGS. 13 and 14, by positioning the secondary throttle valves 40 in the manifold branches 12, the positive pressure which is caused by blowing the mixture back into the intake port is maintained without being attenuated. As a result of this, since the pressure difference between the positive pressure and the vacuum which are produced in the intake ports 4a, 4b, 4c, 4d is maintained at a large pressure difference for a long time, the mixture can be spouted from the channel branches 19 into the intake ports 4a, 4b, 4c, 4d for a long time. In addition, in this embodiment, as illustrated in FIG. 14, since an air flow gap 43 is formed between the upper edge of the secondary throttle valve 40 and the upper inner wall of the manifold branch 12 when the engine is operating under a light load, the air which has passed through the air flow gap 43 flows along the upper walls 30 and 31 of the intake port 4c. Consequently, a strong swirl motion is created in the intake port 4c by the mixture spouted from the channel branch 19 and by the air which has passed through the air flow gap 43.

Figure 15:
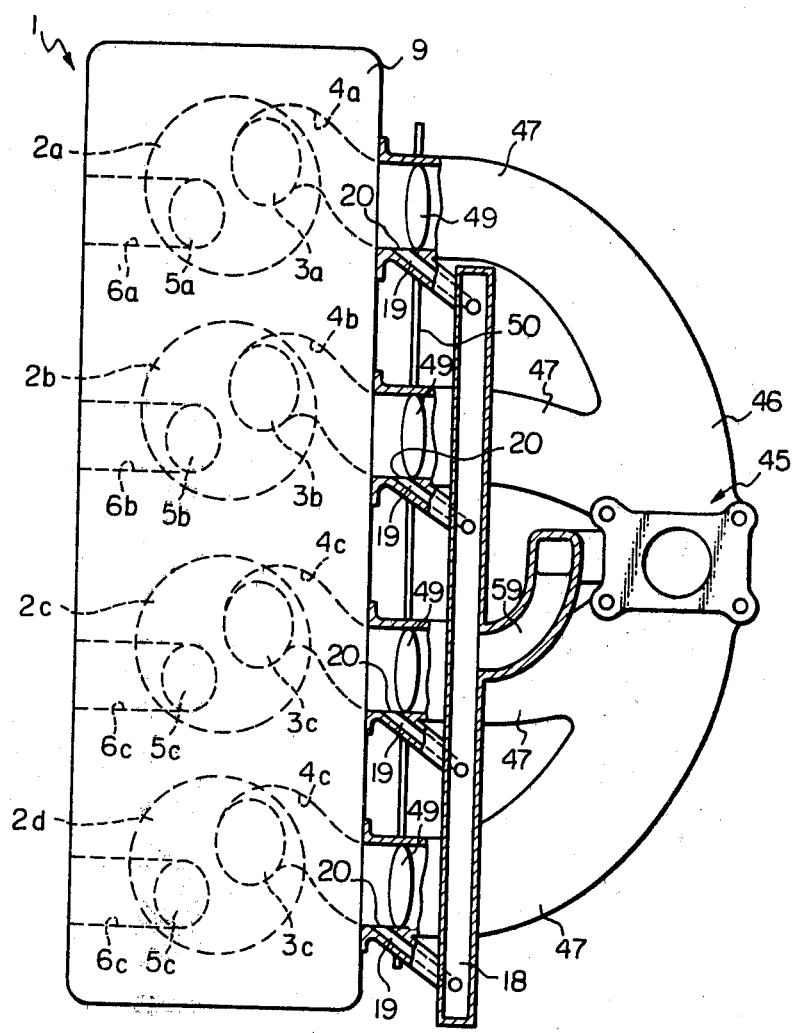
FIG. 15 is a plan view, partly in cross-section, of a still further embodiment according to the present invention.
Figure 16:
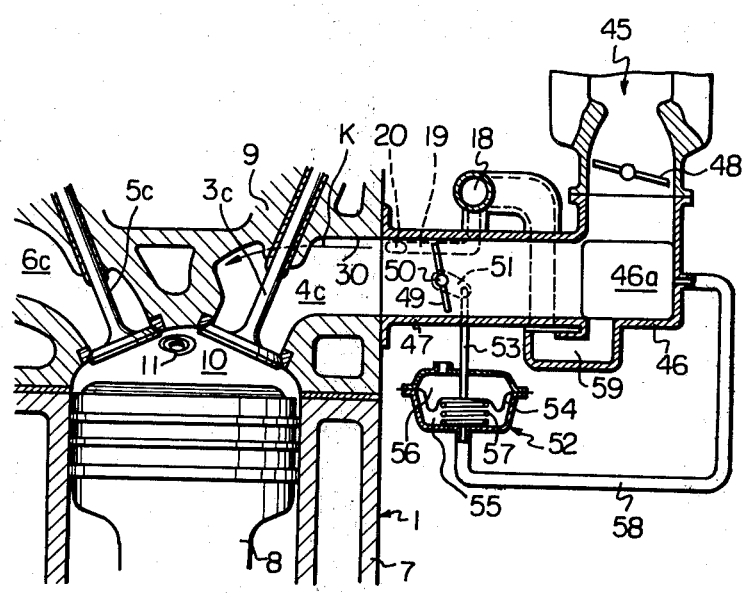
FIG. 16 is a cross-sectional side view of the engine illustrated in FIG. 15.

FIGS. 15 and 16 illustrates a still further embodiment according to the present invention. Referring to FIGS. 15 and 16, an intake manifold 46 equipped with a carburetor 45 is fixed onto the cylinder head 9, and each of manifold branches 47 of the intake manifold 46 is connected to the respective intake port 4a, 4b, 4c, 4d. Secondary throttle valves 49 are arranged in the manifold branches 47, respectively, and all the secondary throttle valves 49 are attached onto a common throttle shaft 50. An arm 51 is fixed onto the common throttle shaft 50 of the secondary throttle valves 49, and a control rod 53 of a vacuum operated diaphragm apparatus 52 is pivotably connected to the tip of the arm 51. The diaphragm apparatus 52 comprises a vacuum chamber 55 and an atmospheric pressure chamber 56, which are separated by a diaphragm 54. A compression spring 57 is inserted into the vacuum chamber 55 for always biasing the diaphragm 54 towards the atmospheric pressure chamber 56. The vacuum chamber 55 is connected to the inside of the intake manifold 46, located downstream of the throttle valve 48, via a vacuum conduit 58, and the control rod 53 is connected to the diaphragm 54. In this embodiment, the channel branches 19 are so arranged that each of the openings 20 of the channel branches 19 is directed tangentially to the upper wall of the corresponding intake port 4a, 4b, 4c, 4d towards the axial direction of the inlet passage portion A (FIG. 5) of the corresponding intake port 4a, 4b, 4c, 4d. In addition, the central portion of the common connecting channel 18 is connected to a collecting portion 46a of the intake manifold 46 via an auxiliary intake passage 59.

When the engine is operating under a light load wherein the opening degree of the throttle valve 48 of the carburetor 45 is small, the level of vacuum produced in the intake manifold 46 is large. As a result of this, since the level of vacuum produced in the vacuum chamber 55 of the diaphragm apparatus 52 becomes large, the diaphragm 54 moves towards the vacuum chamber 55 against the spring force of the compression spring 57. As a result of this, the throttle shaft 50 is rotated, and the secondary throttle valve 49 is positioned at its closed position, as illustrated in FIG. 16. Consequently, at this time, the mixture formed in the carburetor 45 is fed into the combustion chamber 10 of the cylinder which is in the intake stroke via the auxiliary intake passage 59, the common connecting channel 18, the channel branch 19 and the intake port 4c.

As illustrated in FIGS. 15 and 16, the auxiliary intake passage 59, the common connecting channel 18 and the channel branches 19 have an extremely small cross-sectional area. Consequently, since the mixture flows at a high speed in the auxiliary intake passage 59, the common connecting channel 18 and the channel branches 19, flow energy is added to the mixture and, as a result, the vaporization of fuel is promoted. Then, as illustrated by the arrow K in FIG. 16, the mixture is spouted from the channel branch 19 into the intake port 4c along the upper wall 30 of the intake port 4c and, thus, a strong swirl motion is created in the intake port 4c. As a result of this, since the vaporization of the fuel is further promoted and, in addition, a strong swirl motion is created in the combustion chamber 10, the burning velocity is increased and, thus, a stable combustion can be ensured.

When the throttle valve 48 of the carburetor 45 is opened to a great extent and, thus, the engine is operating under a heavy load, since the level of vacuum produced in the intake manifold 46 becomes small, the level of vacuum produced in the vacuum chamber 55 also becomes small. As a result of this, since the diaphragm 54 moves towards the atmospheric pressure chamber 56 due to the spring force of the compression spring 57, the throttle shaft 50 is rotated and, thus, the secondary throttle valves 49 are fully opened. Consequently, at this time, since the mixture formed in the carburetor 45 is fed into the combustion chamber 10 via the manifold branch 47 of the intake manifold 46, which has an extremely small flow resistance, and via the intake port 4c, also having an extremely small flow resistance, a high volumetric efficiency can be ensured.

In this embodiment, by arranging the secondary throttle valves 49 in the manifold branches 47, it is possible to increase the velocity of the mixture spouted from the channel branches 19. That is, if the secondary throttle valves 49 were not arranged in the manifold branches 47, for example, when the No. 1 cylinder 2a is in the intake stroke, the mixture would be sucked into the combustion chamber 10 of the No. 1 cylinder 2a from the channel branches 19 opening into the intake ports 4b, 4c, 4d of the remaining cylinders 2b, 2c, 2d via the intake manifold 46. As a result of this, the amount of the mixture spouted from the channel branch 19 which opens into the intake port 4a is reduced and, thus, the velocity of the mixture spouted from the channel branch 19 which opens into the intake port 4a is reduced. However, by arranging the secondary throttle valves 49 in the manifold branches 47 as illustrated in FIG. 15, since the mixture is fed into the combustion chamber 10 of the No. 1 cylinder 2a only from the channel branch 19 which opens into the intake port 4a when the engine is operating under a light load, the velocity of the mixture spouted from the channel branch 19 which opens into the intake port 4a is increased and, as a result, a strong swirl motion can be created in the intake port 4a.

According to the present invention, by using a helically-shaped intake port having a novel construction which is capable of ensuring a high volumetric efficiency, and by spouting air or air-fuel mixture into the helically-shaped intake port so that it flows along the upper wall of the helically-shaped intake port, the vaporization of fuel and the mixing operation between fuel and air are promoted and, in addition, a strong swirl motion is created in the combustion chamber. As a result, the burning velocity can be considerably increased when an engine is operating under a light load and, thus, a stable combustion can be ensured.

While the invention has been described by reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine, each cylinder having a helically-shaped intake port which comprises a helical portion having an outlet open end, an intake valve arranged in said outlet open end, and an inlet passage portion tangentially connected to said helical portion and having an inlet open end, said inlet passage portion being defined by an upper wall, a bottom wall, a first side wall arranged at a position near an axis of said intake valve, and a second side wall arranged at a position remote from the axis of said intake valve, said engine comprising:
   at least one intake passage common to at least two cylinders and having at least two outlets, each being connected to the inlet open end of a respective one of said intake ports;
   fuel supply means arranged in said intake passage;
   valve means arranged in said intake passage and opened in accordance with an increase in the level of the load of said engine;
   means for supplying an auxiliary flow of gas to each intake port when the respective intake valve is open during the intake stroke, said means including a common connecting passage and at least two branch connecting passages, each being connected to said common connecting passage and having an opening which opens into a respective one of said intake ports in the vicinity of the upper wall of said respective intake port at a position located downstream of said valve means, and further, wherein the first side wall of each of said inlet passage portions has an inclined wall portion which faces downwardly, and the opening of each respective branch connecting passage is directed towards said inclined wall portion, such that when each intake valve is opened, a flow of gas from the opening of the respective branch connecting passage is directed by said inclined wall portion and said upper wall towards the second side wall and thence along the circumference of said helical portion to develop a strong swirl motion prior to passing through said outlet open end into the cylinder.

2. A multi-cylinder internal combustion engine as claimed in claim 1, wherein the width of said inclined wall portion gradually increases towards said helical portion.

3. A multi-cylinder internal combustion engine as claimed in claim 2, wherein said inclined wall portion of said first side wall becomes said entire first wall at a position wherein said inlet passage portion is tangentially connected to said helical portion.

4. A multi-cylinder internal combustion engine as claimed in claim 1, wherein each of said helically-shaped intake ports further comprises a valve guide projecting into said helical portion from the upper wall of said helical portion and having a circumferential wall, an upper part of said first side wall being tangentially connected to the circumferential wall of said valve guide, a lower part of said first side wall being connected to the peripheral side wall of said helical portion.

5. A multi-cylinder internal combustion engine as claimed in claim 1, wherein the second side wall of each of said inlet passage portions is arranged so as to be substantially vertical.

6. A multi-cylinder internal combustion engine as claimed in claim 1, wherein the longitudinal axis of said inlet passage portion extends to be slightly curved.

7. A multi-cylinder internal combustion engine as claimed in claim 1, wherein the width of the upper wall of each of said inlet passage portions is gradually reduced towards said helical portion.

8. A multi-cylinder internal combustion engine as claimed in claim 1, wherein each helical portion has an inner wall and the bottom wall of each of said inlet passage portions is smoothly connected to said inner wall of said respective helical portion which is located at a position near said outlet open end.

9. A multi-cylinder internal combustion engine as claimed in claim 8, wherein the width of the bottom wall of said inlet passage portion gradually decreases towards said helical portion.

10. A multi-cylinder internal combustion engine as claimed in claim 8, wherein said inner wall of said outlet open end is cylindrical, the bottom wall of said inlet passage portion being smoothly connected to said cylindrical inner wall.

11. A multi-cylinder internal combustion engine as claimed in claim 1, wherein each of said helical portions has an upper wall and a peripheral side wall extending circumferentially about the axis of said intake valve and connected to the second side wall of said inlet passage portion, the width of the upper wall of said helical portion gradually decreasing towards a flow direction of a sucked gas.

12. A multi-cylinder internal combustion engine as claimed in claim 11, wherein the upper wall of said helical portion gradually descends towards the flow direction of gas being sucked into said intake port.

13. A multi-cylinder internal combustion engine as claimed in claim 11, wherein the peripheral side wall of said helical portion expands outwards from the periphery of the respective one of said outlet open ends.

14. A multi-cylinder internal combustion engine as claimed in claim 1, wherein each of the openings of said branch connecting passages is arranged in the vicinity of the first side wall of a corresponding one of said inlet passage portions.

15. A multi-cylinder internal combustion engine as claimed in claim 1, wherein each of the openings of said branch connecting passages is directed tangentially to the upper wall of a respective one of said inlet passage portions.

16. A multi-cylinder internal combustion engine as claimed in claim 15, wherein each of the openings of said branch connecting passages is directed towards the axial direction of said respective inlet passage portion.

17. A multi-cylinder internal combustion engine as claimed in claim 1, wherein said intake passage comprises an inlet passage, a collecting portion having an inlet connected to said inlet passage and an outlet, and at least two branch intake passages branched off from the outlet of said collecting portion, each of said branch intake passages being connected to the inlet open end of a respective one of said intake ports.

18. A multi-cylinder internal combustion engine as claimed in claim 17, wherein said fuel supply means comprises a carburetor arranged in said inlet passage.

19. A multi-cylinder internal combustion engine as claimed in claim 17, wherein said fuel supply means comprises at least two fuel injectors, each being arranged in a respective one of said branch intake passages.

20. A multi-cylinder internal combustion engine as claimed in claim 17, wherein said valve means comprises a throttle valve arranged in said inlet passage, said engine further comprising an air passage connecting said common connecting passage to said inlet passage at a location upstream of said throttle valve.

21. A multi-cylinder internal combustion engine having a plurality of cylinders, each having a helically-shaped intake port which comprises a helical portion having an outlet open end, an intake valve arranged in said outlet open end, and an inlet passage portion tangentially connected to said helical portion and having an inlet open end, said inlet passage portion being defined by an upper wall, a bottom wall, a first side wall arranged at a position near an axis of said intake valve, and a second side wall arranged at a position remote from the axis of said intake valve, said engine comprising:
at least one intake passage common to at least two cylinders and including an inlet passage, a collecting portion having an inlet connected to the inlet passage and an outlet, and at least two branch intake passages branched off from the outlet of said collecting portion, each of said branch intake passages being connected to the inlet open end of a respective one of said intake ports;
fuel supply means arranged in said intake passage;
a throttle valve arranged in said inlet passage and opened in accordance with increasing load level of said engine;
a common connecting passage;
an air passage connecting said common connecting passage to said inlet passage at a location upstream of said throttle valve;
a flow control device arranged in said air passage; and
at least two branch connecting passages, each being connected to said common connecting passage and having an opening which opens into a respective one of said intake ports in the vicinity of the upper wall of said intake port, and further, wherein the first side wall of each of said passage portions has an inclined wall portion which faces downwardly, and the opening of each respective branch connecting passage is directed towards said inclined wall portion, such that when each intake valve is opened, a flow of gas from the opening of the respective branch connecting passage is directed by said inclined wall portion and said upper wall towards the second side wall and thence along the circumference of said helical portion to develop a strong swirl motion prior to passing through said outlet open end into the cylinder.

22. A multi-cylinder internal combustion engine as claimed in claim 21, wherein said flow control device comprises an idle adjustment screw.

23. A multi-cylinder internal combustion engine as claimed in claim 21, wherein said flow control device comprises an auxiliary throttle valve operatively connected to said throttle valve and opened in accordance with an increase in the level of the load of said engine, the opening operation of said throttle valve being started only after said auxiliary throttle valve is almost fully opened.

24. A multi-cylinder internal combustion engine as claimed in claim 17, wherein said valve means comprises a primary throttle valve arranged in said inlet passage, and at least two secondary throttle valves each being arranged in said respective branch intake passage.

25. A multi-cylinder internal combustion engine as claimed in claim 24, wherein said common connecting passage is connected only to said branch connecting passages.

26. A multi-cylinder internal combustion engine as claimed in claim 25, wherein said primary throttle valve is opened in accordance with an increase in the level of the load of said engine and operatively connected to said secondary throttle valves for increasing the opening degree of said secondary throttle valves in accordance with an increase in the opening degree of said primary throttle valve.

27. A multi-cylinder internal combustion engine as claimed in claim 26, wherein said primary throttle valve is mechanically connected to said secondary throttle valves.

28. A multi-cylinder internal combustion engine as claimed in claim 24, wherein said common connecting passage is connected to the collecting portion of said intake passage, which is located downstream of said primary throttle valve, via an auxiliary intake passage.

29. A multi-cylinder internal combustion engine as claimed in claim 28, wherein said engine further comprises a vacuum operated diaphragm apparatus connected to said secondary throttle valves for opening said secondary throttle valve in accordance with a reduction in the level of vacuum produced in said intake passage.

30. A multi-cylinder internal combustion engine as claimed in claim 28, wherein said auxiliary intake passage has a cross-sectional area which is smaller than said branch intake passage.

31. A multi-cylinder internal combustion engine as claimed in claim 24, wherein said secondary throttle valves are attached onto a common throttle shaft.

32. A multi-cylinder internal combustion engine as claimed in claim 31, wherein said common throttle shaft is arranged in a wedge-shaped groove formed on a bottom wall of each said branch intake passage.

33. A multi-cylinder internal combustion engine as claimed in claim 1, wherein said common connecting passage has a cross-sectional area which is smaller than that of said intake passage.

34. A multi-cylinder internal combustion engine as claimed in claim 1, wherein each of said branch connecting passages has a cross-sectional area which is smaller than that of said intake passage.

* * * * *